(12) United States Patent
Fontecchio (10) Patent No.: US 9,550,137 B2
(45) Date of Patent: Jan. 24, 2017

(54) FILTER ELEMENT INTERFACE FOR AN OIL FILTER OF AN ENGINE

(71) Applicant: General Electric Company, Schenectady, NY (US)

(72) Inventor: Paul John Fontecchio, Erie, PA (US)

(73) Assignee: General Electric Company, Schenectady, NY (US)

( * ) Notice: Subject to any disclaimer, the term of this patent is extended or adjusted under 35 U.S.C. 154(b) by 755 days.

(21) Appl. No.: 13/852,250

(22) Filed: Mar. 28, 2013

(65) Prior Publication Data

US 2014/0291230 A1 Oct. 2, 2014

(51) Int. Cl.
*B01D 35/00* (2006.01)
*B01D 29/11* (2006.01)
*B01D 29/52* (2006.01)
*B01D 29/54* (2006.01)

(52) U.S. Cl.
CPC ............. *B01D 29/114* (2013.01); *B01D 29/52* (2013.01); *B01D 29/54* (2013.01)

(58) Field of Classification Search
CPC ....... B01D 29/114; B01D 29/54; B01D 29/52; B01D 35/005; B01D 2201/34; B01D 2201/291; B01D 29/50; B01D 33/35; B01D 2201/30; B01D 2201/31; B01D 35/30; B01D 35/306; B01D 24/004; B01D 24/008; B01D 29/58; B01D 24/002; B01D 33/37; F01M 2011/031; Y10S 210/17
USPC .... 210/323.1, 497.01, 348, 483, 493.2, 450, 210/232, DIG. 17, 314, 315, 321.79, 210/321.88, 330, 338, 339, 340, 171, 210/416.5; 123/196 A
See application file for complete search history.

(56) References Cited

U.S. PATENT DOCUMENTS

| 6,334,950 | B1 | 1/2002 | Bogacki et al. | |
|---|---|---|---|---|
| 7,413,089 | B1* | 8/2008 | Tidwell | B01D 27/06 210/130 |
| 8,349,180 | B2 | 1/2013 | Milum | |
| 2007/0045173 | A1* | 3/2007 | Zimmerman | B01D 29/15 210/450 |
| 2008/0179235 | A1* | 7/2008 | Hacker | B01D 29/21 210/232 |

* cited by examiner

*Primary Examiner* — Madeline Gonzalez
(74) *Attorney, Agent, or Firm* — John A. Kramer; Global Patent Operation (57) ABSTRACT

Various systems are provided for an interface between an oil filter element and an oil filter mount of an oil filter. In one embodiment, an oil filter comprises an oil filter element adapted to be fittable over an outwardly projecting step of a first oil filter mount and fittable on a second oil filter mount without an outwardly projecting step, the oil filter element having an opening adapted to sealably engage with a base of the first oil filter mount and a base of the second oil filter mount.

20 Claims, 7 Drawing Sheets

FILTER ELEMENT INTERFACE FOR AN OIL FILTER OF AN ENGINE

FIELD

Embodiments of the subject matter disclosed herein relate to an oil filter of an engine system.

BACKGROUND

Oil filters are used in engine systems to remove contaminants from engine oil before the oil enters the engine. Oil filter elements are mounted within the oil filter and are made up of porous media. As oil passes through the oil filter elements in the oil filter, contaminants become entrained in the filter while clean oil passes through the pores and exits the filter to enter the engine. Oil filters with a smaller pore size may be used to remove more contaminants and increase oil quality of the vehicles in which they are installed. Newer vehicles with increased emissions standards may also utilize oil filter elements with a smaller pore size. Older oil filter elements with a larger pore size may not be adapted for use in new vehicles with higher emissions standards.

BRIEF DESCRIPTION

In one embodiment, an oil filter comprises an oil filter element adapted to be fittable over an outwardly projecting step of a first oil filter mount and fittable on a second oil filter mount without an outwardly projecting step, the oil filter element having an opening adapted to sealably engage with a base of the first oil filter mount and a base of the second oil filter mount.

In one example, the oil filter element may be a first oil filter element comprising porous media with a pore size adapted for use in a vehicle with a first rated emissions level. In this way, the first oil filter element may be fittable to a first oil filter mount and a second oil filter mount. However, a second oil filter element adapted for use in a vehicle with a higher, second rated emissions level may only be fittable to the second oil filter mount.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an oil filter for an engine of a vehicle. An oil filter may comprise an oil filter housing which houses one or more oil filter elements, the oil filter elements comprising a porous media. Specifically, an oil filter element may be adapted to fit within multiple oil filter housings. Additionally, an oil filter mount within an oil filter housing may comprise a step around a cylindrical tube projecting from a base of the oil filter mount. As such, an oil filter element may be adapted to fit over the step of the oil filter mount. However, an older oil filter element comprising a filter media with a larger pore size may not fit over the oil filter mount with the step. In this way, older oil filter elements may not be used within newer vehicles having a higher emissions standard.

Figure 1:
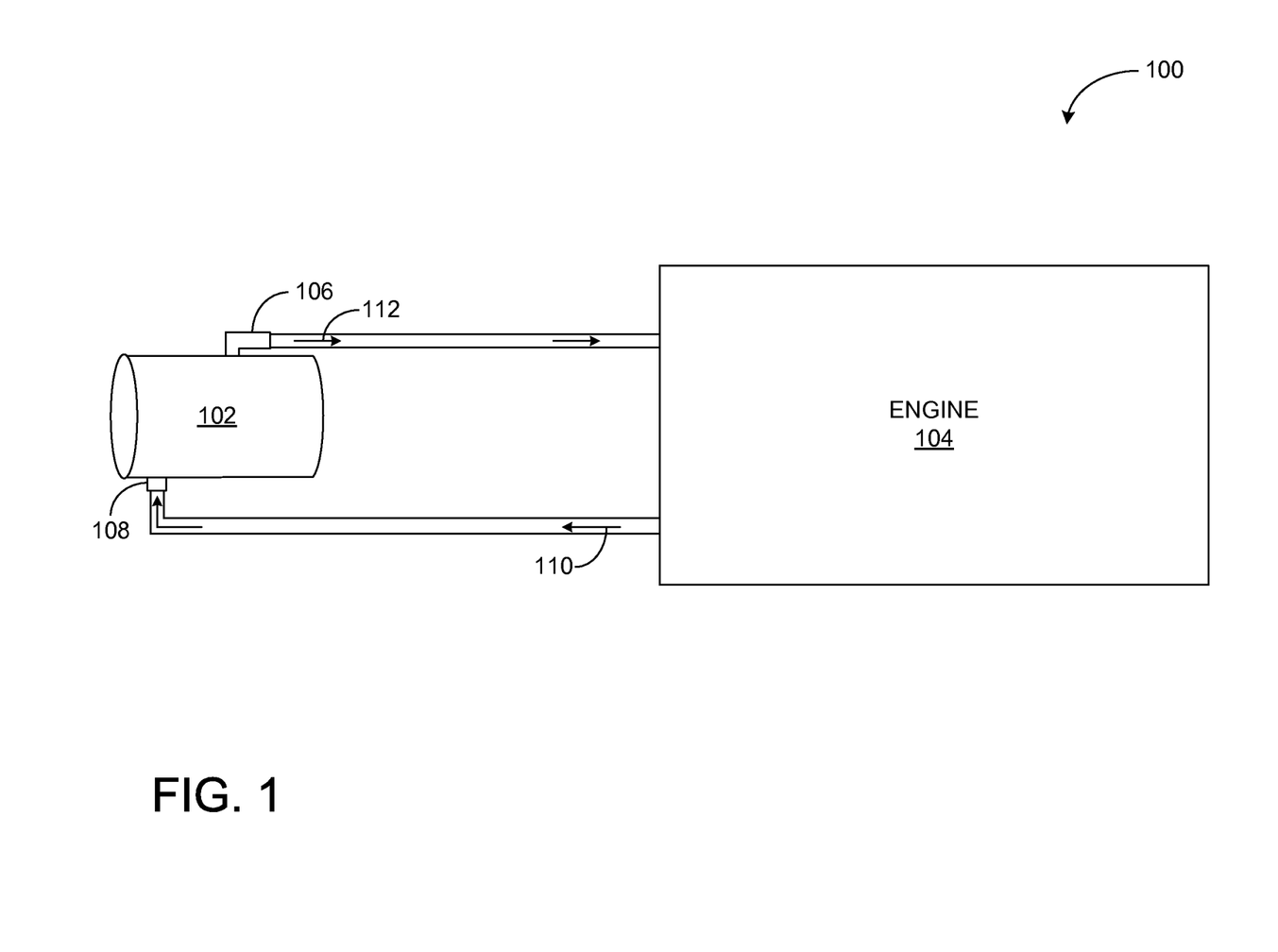
FIG. 1 shows a schematic diagram of an embodiment of an engine and an engine oil filter.
Figure 2:
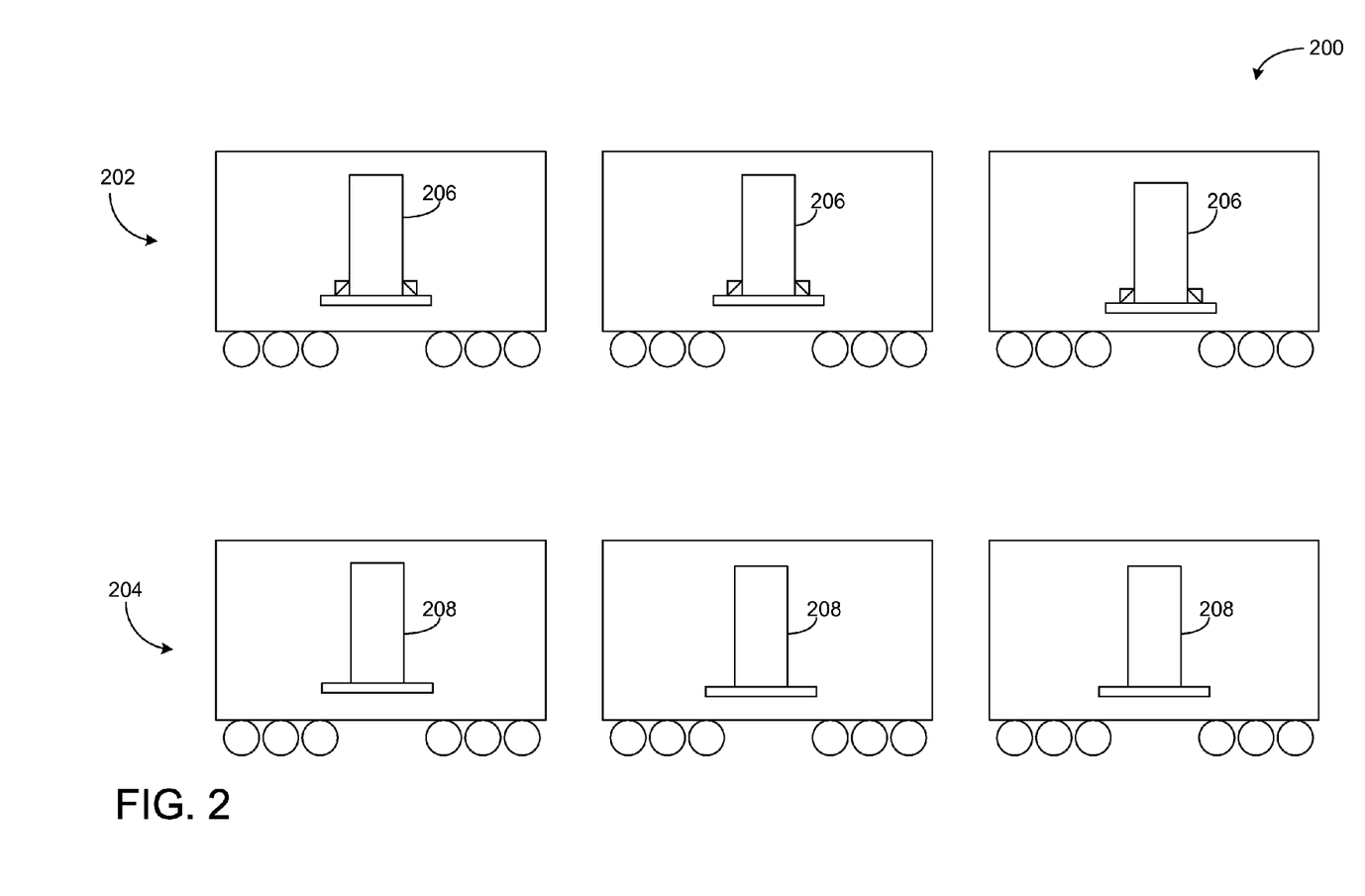
FIG. 2 shows a schematic diagram of a fleet of vehicles according to an embodiment of the invention.

FIG. 1 shows a block diagram of an exemplary embodiment of an engine system 100 with an engine 104, such as an internal combustion engine. In one example, engine system 100 may be included in a fleet of vehicles 200, as shown in FIG. 2, described further below. Engine system 100 also includes an oil filter 102. Oil filter 102 may comprise an oil filter housing, an oil filter mount, and one or more oil filter elements mounted on one or more oil filter mounts within the oil filter housing (not shown in FIG. 1). Further description of the oil filter housing and the interface between the oil filter element and the oil filter mount is presented below with regard to FIGS. 3-9.

Returning to FIG. 1, engine oil may be used to lubricate various engine components within engine 104, such as pistons, bearings which allow rotation of a crankshaft and camshaft, or the like. Before oil is routed to the various engine components, the engine oil may first pass through an oil filter to remove contaminants such as dirt, carbon, and metallic particles. In this way, engine degradation from abrasive wear between particles and engine components may be reduced.

As shown in FIG. 1, engine oil 110 may flow from the engine 104 to an oil inlet 108 of the oil filter 102. The engine oil 110 then flows through the inside of the oil filter 102 where contaminants may be filtered from the engine oil 110. After passing through the oil filter 102, filtered engine oil 112 exits at an oil outlet 106 of the oil filter 102 and flows back into the engine 104 where the oil may be used again by the engine components.

FIG. 2 shows a schematic of a fleet of vehicles 200. The fleet of vehicles 200 comprises a first group of vehicles 202 and a second group of vehicles 204. In one example, the vehicles of the first group and second group may be rail vehicles. In another example the vehicles of the first group and second group may be another type of vehicle such as on-road transportation vehicles or mining vehicles, marine vessels, or other off-highway vehicles (OHV), or the like.

The first group of vehicles 202 and the second group of vehicles 204 may have different emissions standards, or may be certified to meet different emission standards. The emissions standards for each group of vehicles may be defined with a rated engine emissions level. In one example, the rated engine emissions level may include an emissions level indicative of a maximum steady state emissions level of the vehicle. In another example, the rated engine emissions level may include an emissions level indicative of a maximum transient emissions level of the vehicle. Additionally, the first group of vehicles 202 and the second group of vehicles 204 may include different oil filters comprising oil filter elements with different pore sizes. An oil filter having a smaller pore size may improve oil quality relative to an oil filter having a larger pore size.

The first group of vehicles 202 shown in FIG. 2 may have a first rated engine emissions level. As shown in FIG. 2, the first group of vehicles 202 has a first oil filter interface 206. The first oil filter interface has a first oil filter mount with a linearly outwardly projecting step surrounding a first cylindrical projecting tube. Further details on embodiments of the first oil filter interface are presented below with reference to FIG. 7.

The second group of vehicles 204 may have a second rated engine emissions level. The second rated engine emissions level may be higher than the first rated engine emissions level of the first group of vehicles 202. Thus, pursuant to governmental regulations for example, the second group of vehicles may be allowed to produce more emissions than the first group of vehicles. As shown in FIG. 2, the second group of vehicles 204 has a second oil filter interface 208. The second oil filter interface 208 is different than the first oil filter interface 206. The second oil filter interface 208 has a second oil filter mount with a cylindrical projecting tube. The second oil filter mount does not have the linearly projecting step of the first oil filter mount. Further details on embodiments of the first and second oil filter interfaces and mounts are presented below with reference to FIGS. 4-9.

The fleet of vehicles 200 may use two or more types of oil filters, each oil filter having a different pore size. A first oil filter with a first pore size may be fittable to both the first oil filter interface 206 and the second oil filter interface 208. Specifically, an opening or neck of the first oil filter may be wider than the first oil filter mount and the second oil filter mount. Thus, the first oil filter may be used in both the first group of vehicles 202 and the second group of vehicles 204. A second oil filter with a second, larger pore size may only be fittable to the second oil filter interface of the second group of vehicles 204. A neck of the second oil filter may be wider than the second oil filter mount but narrower than the first oil filter mount. Further details on embodiments of the first and second oil filters are presented below with reference to FIGS. 3-9.

Figure 3:
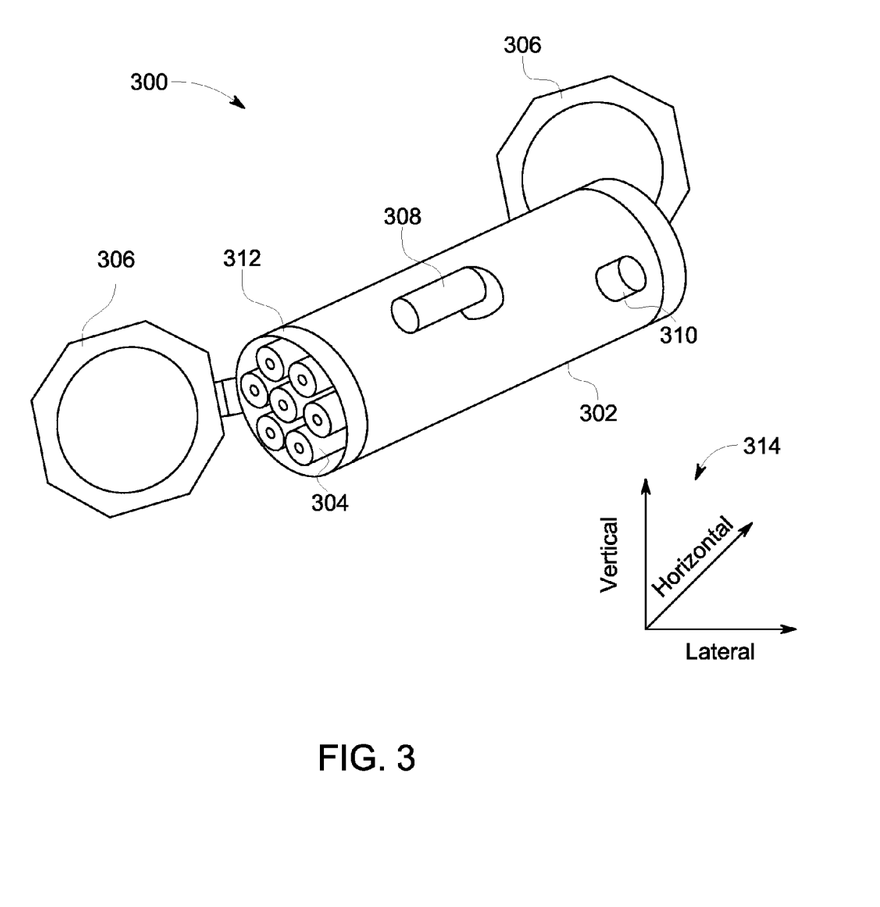
FIG. 3 shows a schematic of an oil filter according to an embodiment of the invention.
Figure 4:
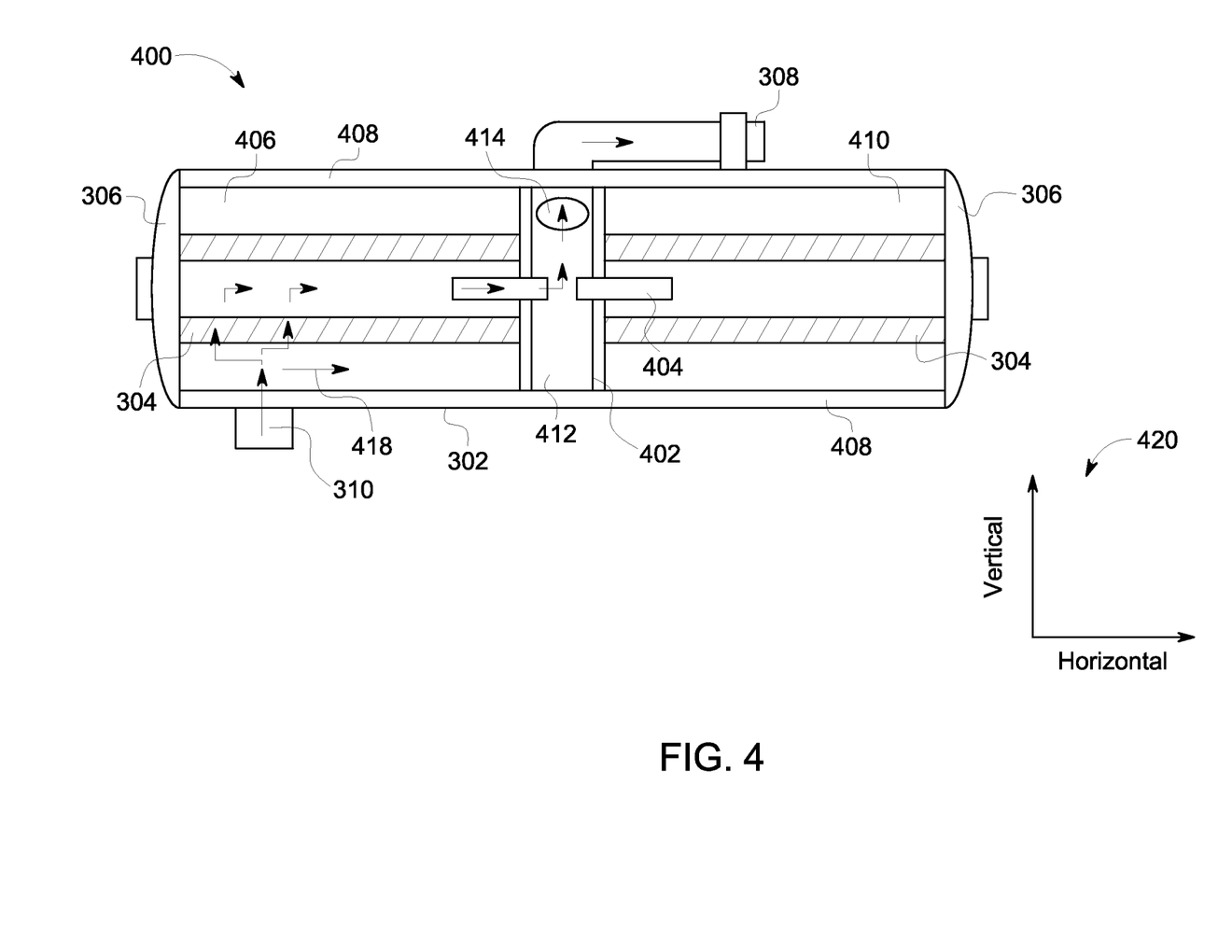
FIG. 4 shows a schematic of an oil filter with an oil filter mount according to an embodiment of the invention.
Figure 5:
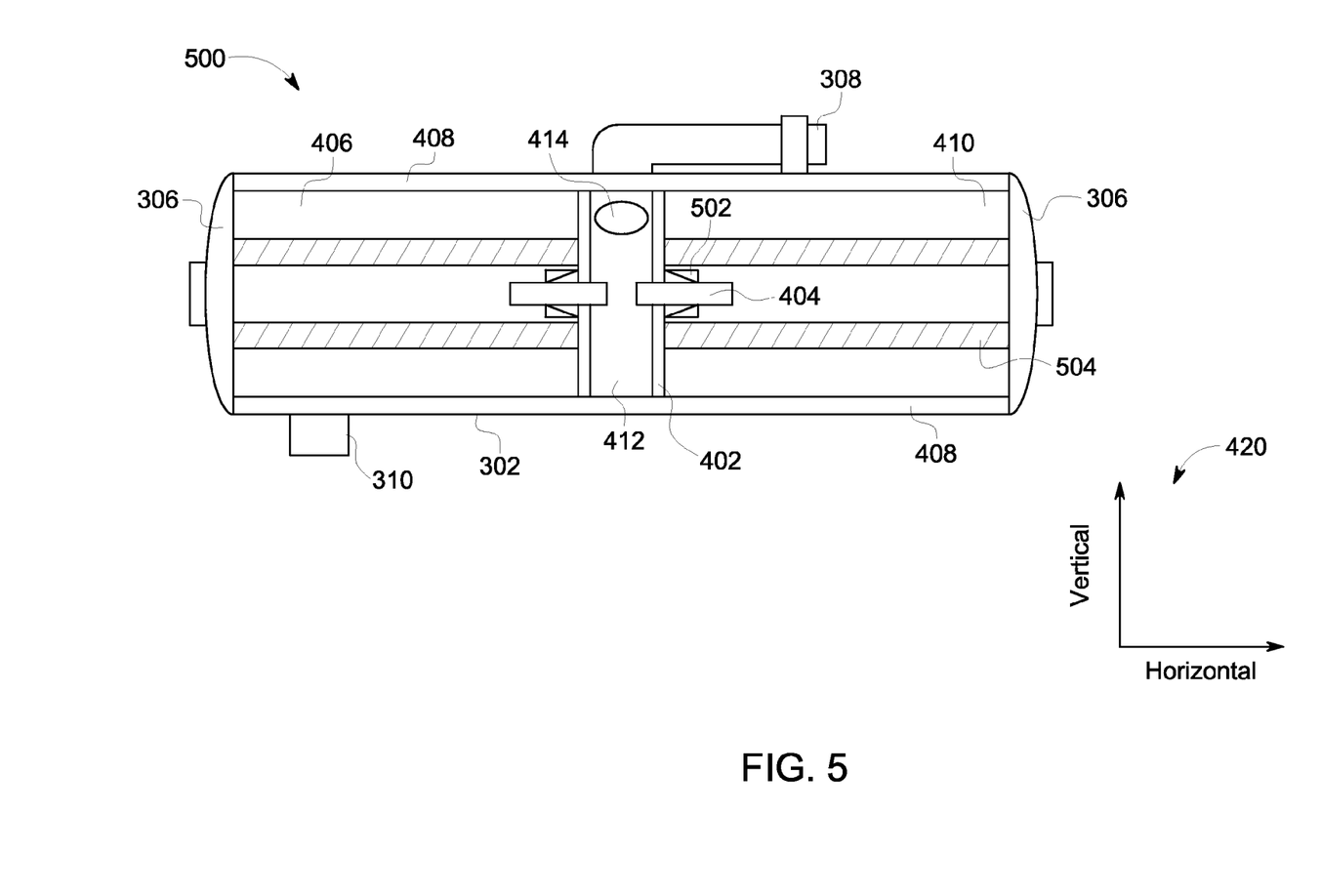
FIG. 5 shows a schematic of an oil filter with an oil filter mount according to another embodiment of the invention.

FIGS. 3-5 show schematics of different embodiments of an oil filter that may be included as the oil filter 102 shown in engine system 100 of FIG. 1. FIG. 3 shows an isometric view of an oil filter 300 with respect to axis system 314. Axis system 314 includes a lateral axis, a horizontal axis, and a vertical axis. As shown in FIG. 3, oil filter 300 includes an oil filter housing 302. The oil filter housing 302 is a hollow cylinder or tube within which a plurality of oil filter elements 304 are positioned. An oil inlet 310, extending outwardly from an external surface of the oil filter housing 302, is positioned near one end of the oil filter housing 302. Oil may flow into the oil inlet 310, through the oil filter elements 304 within the oil filter 300, and then exit the oil filter through an oil outlet 308. The oil outlet 308 is positioned centrally along the horizontal axis of the oil filter 300. The oil outlet 308 comprises a cylindrical tube which extends outwardly from the external surface of the oil filter housing 302. The cylindrical tube of the oil outlet 308 includes a 90 degree bend, so that the tube of the oil outlet 308 is parallel with the horizontal axis.

The oil filter 300 has two filter engagement surfaces or doors 306 positioned at either end of the oil filter housing 302. The doors 306 are sealable to the ends of the oil filter housing 302, at an engagement ring 312, with a plurality of fasteners (e.g., screws, bolts) positioned around the circumference of the door 306. In one example, the engagement ring 312 may comprise a plurality of mounting brackets for fastening the door 306 to the oil filter housing 302. The doors 306 may be sealable to the ends of the oil filter housing 302 such that no air or fluid may pass into or out of the oil filter 300 through the doors 306 when the doors are closed or sealed to the oil filter housing 302. If the oil filter elements do not fit within the oil filter housing 302 (e.g., incorrect filter element size is used), the doors 306 may be unable to close and seal to the engagement ring 312.

FIGS. 4-5 show a sectional side view of an oil filter, such as oil filter 300 in FIG. 3. As such, the section shown in FIGS. 4-5 may be a section taken along a vertical axis of the oil filter 300. The oil filter schematics of FIGS. 4-5 show an internal view of an oil filter in a plane formed by a vertical axis and horizontal axis, as shown by an axis system 420. Turning to FIG. 4, one embodiment of an oil filter 400 is shown. The oil filter 400 may contain like components to those presented in FIG. 3. As discussed above with regard to FIG. 3, oil filter 400 includes an oil filter housing 302, two doors 306, an oil inlet 310, and an oil outlet 308.

As described in FIG. 3, the oil filter housing 302 is a hollow tube. As shown in FIG. 4, the oil filter housing 302 includes an oil filter housing wall 408. The inside of the oil filter 400 (e.g., inside the oil filter housing 302) may be split up into two cavity portions with a central oil passage 412. A first cavity 406 is formed by the oil filter housing wall 408, one of the engagement surfaces or doors 306, and the central oil passage 412. A second cavity 410 is formed by the oil filter housing wall 408, the opposite door 306, and the central oil passage 412. For illustrative purposes, FIG. 4 shows one oil filter element 304 positioned in each of the first cavity 406 and the second cavity 410. However, more than one oil filter element 304 may be positioned within each cavity. For one example, as shown in FIG. 3, seven oil filter elements 304 may be positioned in each cavity of the oil filter 400. In this way, the oil filter 400 may contain fourteen oil filter elements 304 in total. In other examples, the oil filter 400 may include more or less than fourteen oil filter elements 304.

The central oil passage 412 comprises a hollow cylinder positioned centrally along the horizontal axis of the oil filter 400. The two ends of the cylinder form a base 402 of an oil filter mount. The oil filter mount further includes a cylindrical projecting tube 404 which extends outwardly from an interior cavity and the base 402 of the central oil passage 412 toward the filter engagement surface or door 306 of the oil filter housing 302. A plurality of cylindrical projecting tubes 404 may be fluidly coupled to the interior cavity of the central oil passage 412. In the example presented in FIG. 3, there are seven cylindrical projecting tubes 404 in each cavity of the oil filter 300 (e.g., one for each oil filter element 304). The central oil passage 412 further includes a fluid opening 414 which allows oil to pass from the interior cavity of the central oil passage 412 to the oil outlet 308.

The oil filter element 304 is annular shaped with a cylindrical bore centered along a horizontal axis of the oil filter element. The oil filter element 304 comprises a porous material, wherein the porous material may be one or more of a cellulose media or a fibrous media. The pores of the oil filter element 304 allow oil to pass through the filter element while entraining larger particles and/or impurities suspended in the oil. These particles may be too large to pass through the pores, thereby causing them to remain within the porous material of the oil filter element 304. As such, a smaller pore size of the porous media may allow more particles to be removed from the engine oil. Further details on oil filter elements with different pore sizes are presented below with regard to FIGS. 6-9.

The oil filter element 304 is adaptable to extend from the base 402 of the oil filter mount to the filter engagement surface (e.g., door) 306 of the oil filter housing 302. As such, the oil filter element 304 contacts the base 402 at a first end of the oil filter element 304 and contacts the door 306 at a second end of the oil filter element 304. As discussed above with reference to FIG. 3, the filter engagement surface or door 306 is sealable against the second end of the oil filter element 304. The oil filter element 304 is fittable over the cylindrical projecting tube 404 of the oil filter mount. Further details on embodiments of the interface between the oil filter element 304 and the oil filter mount is presented below with reference to FIGS. 6-9.

Engine oil 418 may flow from the engine into the oil filter 400 through the oil inlet 310. Engine oil 418 passes through the porous material of the oil filter element 304 and into the cylindrical bore. Engine oil 418 then flows through the bore toward the central oil passage 412. The cylindrical projecting tube 404 allows engine oil 418 to flow from the cylindrical bore of the oil filter element 304 to the interior cavity of the central oil passage. Engine oil 418 then flows through the cavity of the central oil passage 412 and out the fluid opening 414 to the oil outlet 308. Filtered oil may then return to the engine.

Turning now to FIG. 5, a second embodiment of an oil filter 500 is shown. The oil filter 500 may contain like components to those presented in FIGS. 3-4. As discussed above with regard to FIGS. 3-4, oil filter 500 includes an oil filter housing 302, two doors 306, and oil inlet 310, and an oil outlet 308. As shown in FIG. 4, oil filter 500 includes a central oil passage 412 with fluid opening 414 to oil outlet 308. Each end of the central oil passage 412 forms a base 402 of an oil filter mount.

As in FIG. 4, the oil filter mount further includes a cylindrical projecting tube 404 which extends outwardly from an interior cavity and the base 402 of the central oil passage 412 toward the filter engagement surface or door 306 of the oil filter housing 302. However, the oil filter mount of oil filter 500 is different than the oil filter mount of oil filter 400 shown in FIG. 4. The oil filter mount of oil filter 500 includes a linearly outwardly projecting step 502 whereas the oil filter mount of oil filter 400 does not include a step. The step 502 is linearly outwardly projecting, for example, as it extends directly outward, in a linear direction, from the base 402.

The linearly outwardly projecting step 502 extends around the circumference of the cylindrical projecting tube 404. In this example, the width, along the vertical axis, of the cylindrical projecting tube 404 is the same in the oil filter 400 and the oil filter 500. Thus, the step may act as a spacer requiring an oil filter element 504 with a wider neck and/or bore. Embodiments of the neck of the oil filter element 504 are shown in further detail in FIGS. 6-9, discussed below. As such, the oil filter element 504 is fittable over the step 502 and the cylindrical projecting tube 404 of the oil filter mount. As described with regard to FIG. 4, the oil filter element 504 contacts the base 402 at a first end of the oil filter element 504 and extends from the base 402 to the door 306. The oil filter element 504 contacts the door 306 at a second end of the oil filter element. In alternate examples, the oil filter element 504 may extend toward the door 306 but not contact the door 306.

The step 502 may have various geometries and sizes depending on the oil filter embodiment. In one example, as shown in FIG. 5, the step 502 has a triangular cross-section and extends circumferentially, as one piece, around the cylindrical projecting tube 404. In this example, a first end of the step 502 contacts the base 402 of the oil filter mount at an outside edge of the step and a second end of the step 502 contacts the cylindrical projecting tube 404 at an inside edge of the step. In another example, the step may have a rectangular or square cross-section and extend circumferentially, as one piece, around the cylindrical projecting tube 404. In this example, the step contacts the base 402 at a bottom edge (along vertical axis) of the step and contacts the cylindrical projecting tube 404 at an inside edge (along horizontal axis) of the step. In yet another example, the step may have a circular cross-section and be shaped like a doughnut (i.e., toroidal) extending circumferentially around the cylindrical projecting tube 404.

In another embodiment, the step 502 or spacer may not be one continuous piece extending circumferentially around the cylindrical projecting tube 404. For example, there may be one or more steps or spacers positioned around the circumference of the cylindrical projecting tube 404. In one example, two triangular blocks or projections may be positioned, on opposite sides, along the circumference of the cylindrical projecting tube 404. In another example, the spacer segments may be rectangular or square blocks.

Regardless of the geometry and/or size, the step 502 may be coupled to the cylindrical projecting tube 404 and base 402 of the oil filter mount in different ways. In one example, the step 502 and the cylindrical projecting tube 404 are integrated together. As such, the step and cylindrical projecting tube 404 may be one piece. In another example, the step 502 may be formed as a separate part and then fixed to the cylindrical projecting tube 404 and/or the base 402. The step 502 may be fixed to these parts by welding, bolting, or other like means. In yet another example the step 502 may comprise a rubber material and be tightly fit at the inside edge to the cylindrical projecting tube 404 and at the outside edge to the base 402 of the oil filter mount. The step may be tightly fit such that it contacts the outside of the cylindrical projecting tube 404 and remains in contact with the base 402 without shifting position. For example, the inner circumference of the step 502 may be sized such that it is slightly smaller than the outer circumference of the cylindrical projecting tube 404. As such, when the step 502 is positioned on the cylindrical projecting tube 404 it may be tightly fit such that it does not shift position.

As shown in FIGS. 4-5, an oil filter may include an interface between an oil filter element and an oil filter mount. In one example, a first oil filter mount may include an outwardly projecting step. In another example, a second oil filter mount may not include an outwardly projecting step. A first oil filter element may be adapted to be fittable over the outwardly projecting step of the first oil filter mount and fittable on the second oil filter mount without the outwardly projecting step. As described further below, the first oil filter element may have an opening adapted to sealably engage with a base of the first oil filter mount and a base of the second oil filter mount.

Figure 6:
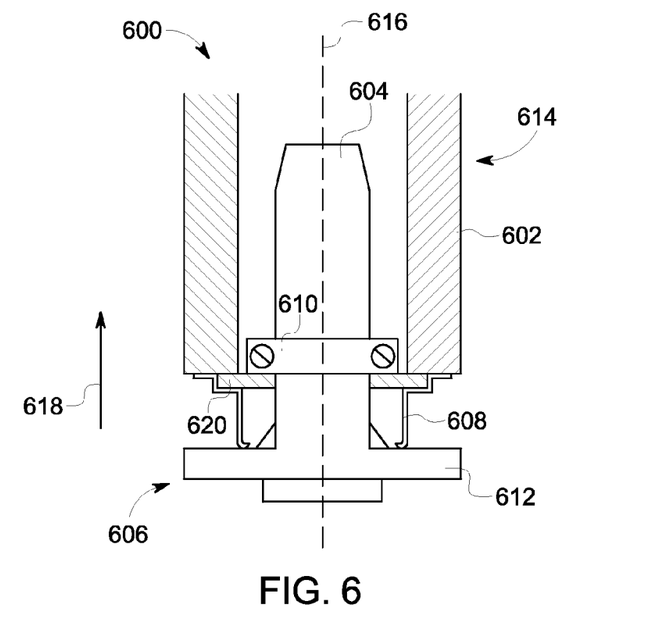
FIGS. 6-9 show schematics of an oil filter interface according to embodiments of the invention.

FIG. 6 shows a schematic of an oil filter interface 600 comprising the second oil filter mount without the step. The oil filter interface 600 includes an interface between an oil filter mount 606 and an oil filter element 614. The oil filter mount 606 includes a base 612 and a cylindrical projecting tube 604, as described above with reference to FIGS. 4-5. The oil filter element 614 includes a filter body 602, wherein the filter body 602 comprises a porous material. The oil filter element 614 further includes a neck 608 and a ring seal 610.

The neck 608 is centered along a horizontal axis 616 of the oil filter element. The neck 608 is fittable over the cylindrical projecting tube 604 of the oil filter mount 606. In one example, the neck 608 may comprise a sheet metal material. Further, the neck 608 of the oil filter element 614 is annular with a curved base configured to contact the base 612 of the oil filter mount 606. The curved base may have a convex or concave curve and may curve inward and towards the cylindrical projecting tube 604 or outward and away from the cylindrical projecting tube 604. In another example, the neck 608 may have a straight base without curvature. The ring seal 610 is positioned vertically above (shown by vertical direction 618) the neck 608 of the oil filter element, relative to the base 612 of the oil filter mount 606. The ring seal 610 is coupled to an edge 620 of the cylindrical bore of the oil filter element 614 and sealably engages with the cylindrical projecting tube 604 of the oil filter mount 606. The ring seal 610 may prevent the oil filter element 614 from moving in the vertical direction 618, away from the base 612 of the oil filter mount 606.

As described above, the oil filter element 614 may be a second oil filter element and the oil filter mount 606 may be a second oil filter mount. As such, the second oil filter element may be adapted to fit over the second oil filter mount. However, the oil filter element 614 may not be fittable over a first oil filter mount, such as the oil filter mount shown in FIG. 7.

Figure 7:
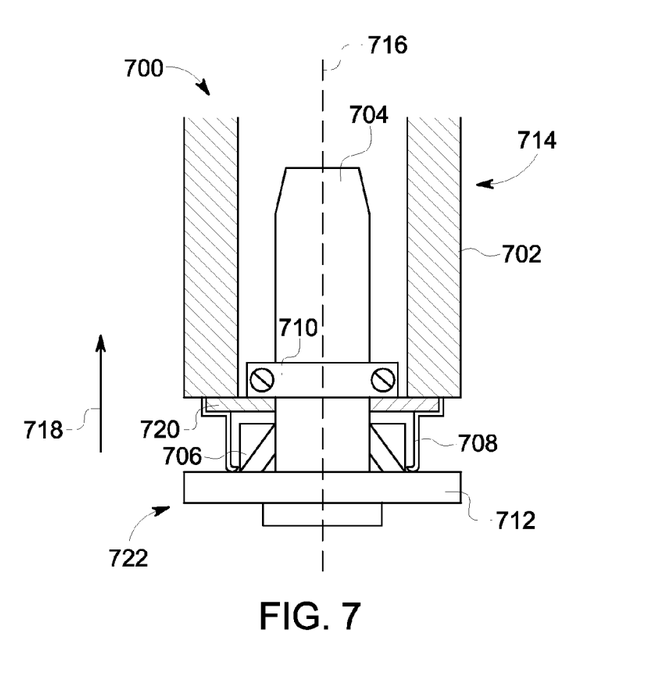

FIG. 7 shows a schematic of an oil filter interface 700 comprising the first oil filter mount with the outwardly projecting step. The oil filter interface 700 includes an interface between an oil filter mount 722 and an oil filter element 714. The oil filter mount 722 includes a base 712, a cylindrical projecting tube 704, and a linearly outwardly projecting step 706, as described above with reference to FIGS. 4-5. As described above, the step 706 may extend around the circumference of the cylindrical projecting tube 704. A first end of the step 706 contacts the base 712 of the oil filter mount 722 at an outside edge of the step and a second end of the step contacts the cylindrical projecting tube 704 at an inside edge of the step.

The oil filter element 714 includes a filter body 702, wherein the filter body 702 comprises a porous material. The porous material may have a nominal pore size of 12 microns. In other examples, the pore size may be something smaller or larger than 12 microns. The pore size of the oil filter element 714 is smaller than the pore size of the oil filter element 614 shown in FIG. 6. For example, if the oil filter element 614 is a 28 micron filter, the oil filter element 714 may have a pore size smaller than 28 microns. In another example, the oil filter element 714 may have an inner and outer stage with filter media of varying pore size. In this example, the oil filter element 714 may still provide increased filtration over the oil filter element 614. In this way, the oil filter element 714 may entrain more oil impurities, thereby limiting abrasive wear of engine components.

The oil filter element 714 further includes an open neck 708 at a first end of the oil filter element 714 and a ring seal 710. The neck 708 is centered along a horizontal axis 716 of the oil filter element 714. As shown in FIG. 7, the open neck 714 is wider than the linearly outwardly projecting step 706 on the base 712 of the oil filter mount 722. The neck 708 is fittable over an outer edge of the step 706 and the cylindrical projecting tube 704 of the oil filter mount 722. In one example, the neck 708 may comprise a sheet metal material. Further, the neck 708 of the oil filter element 714 is annular with a curved base configured to contact the base 712 of the oil filter mount 722. The curved base may have a convex or concave curve and may curve inward and towards the cylindrical projecting tube 704 or outward and away from the cylindrical projecting tube 704. In another example, the neck 708 may have a straight base without curvature. The ring seal 710 is positioned vertically above (shown by vertical direction 718) the neck 708 of the oil filter element. The ring seal 710 is coupled to an edge 720 of the cylindrical bore of the oil filter element 714 and sealably engages with the cylindrical projecting tube 704 of the oil filter mount 722. The ring seal 710 may prevent the oil filter element 714 from moving in the vertical direction 718, away from the base 712 of the oil filter mount 722.

As described above, the oil filter element 714 may be a first oil filter element and the oil filter mount 722 may be a first oil filter mount. As such, the first oil filter element may be adapted to fit over the first oil filter mount, including the step 706. The oil filter element 714 may also be fittable over the second oil filter mount, such as the oil filter mount 606 shown in FIG. 6.

Figure 8:
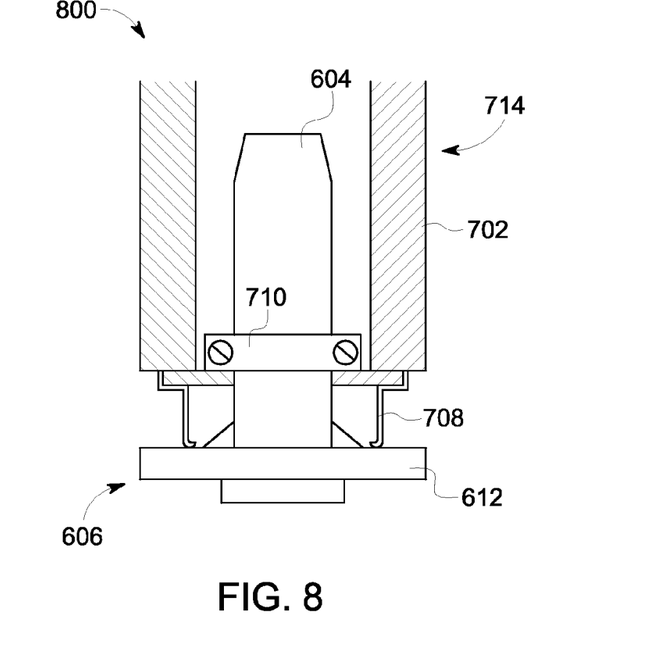

FIG. 8 shows a schematic of an oil filter interface 800 between the second oil filter mount 606 (presented at FIG. 6) and the first oil filter element 714 (presented at FIG. 7). As described above, the second oil filter mount 606 does not include a step. Thus, the wider neck 708 of the first oil filter element 714 fits over the cylindrical projecting tube 604 and contacts the base 612 of the second oil filter mount 606. As such, the first oil filter element 714 may be used in a group of vehicles with the first oil filter mount (such as the first group of vehicles 202 shown in FIG. 2) and in a group of vehicles with the second oil filter mount (such as the second group of vehicles 204 shown in FIG. 2).

Figure 9:
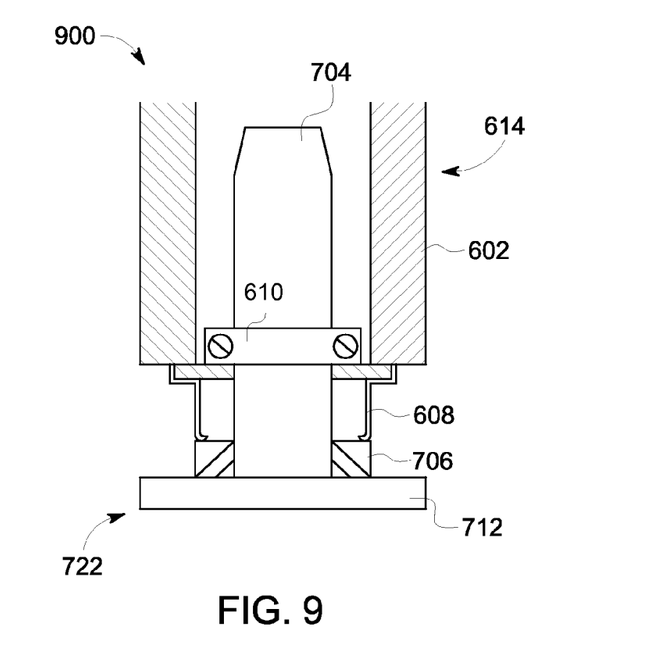

FIG. 9 shows a schematic of an oil filter interface 900 between the first oil filter mount 722 (presented at FIG. 7) and the second oil filter element 614 (presented at FIG. 6). As described above, the first oil filter mount 722 includes a step 706. The step 706 increases the width of which the neck 608 or opening of the second oil filter element 614 must fit around. The neck 608 at a first end of the second oil filter element 614 is narrower than the step 706 of the first oil filter mount 722. As a result, the neck of the second oil filter element 614 contacts a top, outside edge of the step 706 instead of contacting the base 712 of the oil filter mount 722. This may cause a second end, opposite the first end, of the second oil filter element 614 to extend past the filter engagement surface or door of the oil filter housing. Thus, the door of the oil filter housing may not close and may not be sealable against the second end of the second oil filter element 614, thereby causing oil to leak from the oil filter. As such, the second oil filter element 614 may only be fittable to the second oil filter mount 606.

Thus, the systems shown in FIGS. 1-7 provide for means for filtering engine oil; means for housing a filter body of an oil filter element; and means for engaging the oil filter element to an oil filter mount. In one example, the means for filtering engine oil may be provided by an oil filter media housed within the filter body, such as the filter body described above with respect to FIG. 7. In another example, the means for housing the filter body of the oil filter element may be provided by an oil filter housing, such as the oil filter housing described above with respect to FIGS. 3-5. Further, the means for engaging the oil filter element to the oil filter mount may be provided by a neck of the oil filter element, the neck defining an opening for engaging the oil filter mount. In one example, the neck may be wider than an outwardly projecting step and cylindrical projecting tube of the oil filter mount.

In this way, a system for an oil filter may comprise an interface between an oil filter element and a first oil filter mount. The oil filter element may have an open neck wider than a linearly outwardly projecting step on a base of the first oil filter mount. The oil filter element may comprise a porous material having a pore size based on a rated emission level of a vehicle in which the oil filter is positioned. The oil filter element may fittable over the first oil filter mount with the step, as well as fittable over a second oil filter mount without the step. As such, the oil filter element may be adaptable to fit over various oil filter mount configurations. However, other oil filter elements with an open neck narrower than the linearly outwardly projecting step on the base of the first oil filter mount may only be fittable over the second oil filter mount without the step.

Another embodiment relates to a system comprising an oil filter element and an oil filter mount. The oil filter mount comprises a base and a linearly outwardly projecting step connected to the base. The oil filter element has an open neck at a first end of the oil filter element. The open neck is wider than the linearly outwardly projecting step of the oil filter mount. The open neck of the oil filter element may be fittable over an outer edge of the step, such that the oil filter element is configured to contact the base of the oil filter mount at the first end when the oil filter element is installed for use on the oil filter mount.

In another embodiment of the system, the system further comprises an oil filter housing. The oil filter element is configured so that when installed, the oil filter element extends outwardly from the base of the oil filter mount to a filter engagement surface of the oil filter housing. The filter engagement surface may be sealable against a second end of the oil filter element.

In another embodiment of the system, the oil filter mount further comprises a cylindrical projecting tube connected to the base of the oil filter mount and extending outwardly from the base of the oil filter mount and toward the filter engagement surface of the oil filter housing. The step extends at least partially around a circumference of the cylindrical projecting tube.

In another embodiment of the system, a first end of the step contacts the base of the oil filter mount at an outside edge of the step, and a second end of the step contacts the cylindrical projecting tube at an inside edge of the step. In another embodiment, alternatively or additionally, the step is coupled to the cylindrical projecting tube. In another embodiment, alternatively or additionally, the step comprises a rubber material, and the step is tightly fit at the inside edge to the cylindrical projecting tube and at the outside edge to the base of the oil filter mount.

In another embodiment, a system comprises an oil filter mount and an oil filter element. The oil filter mount comprises a base, a tube connected to the base and projecting outwards from the base, and a step connected to the base and tube. (The tube may be cylindrical, or it may have another cross-sectional profile, such as a rectangle, oblong, oval, or the like.) A first maximum lateral dimension defined by the tube and step together is greater than a second maximum lateral dimension of the tube by itself at a location axially spaced away from the step and base. ("Lateral dimension" refers to a dimension in a direction perpendicular to a long axis of the oil filter mount, e.g., the dimension is perpendicular to 718 in FIG. 7.) The oil filter element comprises a filter body, a seal attached to a first end of the filter body, and a neck attached to the first end of the filter body. The neck defines an opening having a third lateral dimension corresponding to the first maximum lateral dimension of the tube and step, such that the oil filter element is configured, when the oil filter element is disposed over the oil filter mount, for the neck to fit over the step and a distal end of the neck (the end of the neck opposite the filter element, which defines the limit of one end of the filter element) to abut the base. According to another aspect, the step may prevent other oil filter elements, having necks with openings sized smaller than the third lateral dimension, from fitting over the step and abutting the base. In embodiments, the step extends around the entirety of the periphery of the tube; in other embodiments, the step extends only partway around the periphery of the tube.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. An oil filter, comprising:
a cylindrical housing; and
a plurality of oil filter elements positioned within the housing, where each oil filter element of the plurality of oil filter elements is adapted to be:
    fittable over an outwardly projecting step of an oil filter mount of the oil filter; and
    fittable on a second oil filter mount of a second oil filter, the second oil filter mount without an outwardly projecting step,
    each oil filter element having an opening adapted to sealably engage with a base of the oil filter mount and a base of the second oil filter mount, where the opening is defined by a neck of the oil filter element that is centered along a horizontal axis of the oil filter element and that is coupled to and extends away from a bottom surface of a filter body of the oil filter element, the filter body comprising a porous material;
    wherein an inside of the oil filter is split into a first cavity, a second cavity, and a central oil passage, the central oil passage separating the first cavity and second cavity and the central oil passage forming the base of the oil filter mount, and wherein each oil filter element of the plurality of oil filter elements is positioned within one of the first cavity or the second cavity.

2. The oil filter of claim 1, wherein each oil filter element is annular shaped with a cylindrical bore centered along the horizontal axis of the oil filter element, and wherein the step is linearly outwardly projecting from the base of the oil filter mount.

3. The oil filter of claim 2, wherein the neck is fittable over the linearly outwardly projecting step and a cylindrical projecting tube of the oil filter mount, where the cylindrical projecting tube extends from the base of the oil filter mount and into the cylindrical bore of the oil filter element, past the step and the neck, and wherein the step contacts both the base of the oil filter mount and an outside of the cylindrical projecting tube.

4. The oil filter of claim 3, wherein the neck of each oil filter element comprises a sheet metal material and wherein the neck is positioned inward of an outer surface of the filter body.

5. The oil filter of claim 3, wherein the neck of each oil filter element is annular with a curved base configured to contact the base of the oil filter mount and the base of the second oil filter mount.

6. The oil filter of claim 3, wherein each oil filter element further comprises a ring seal positioned within the cylindrical bore, vertically above the neck of the oil filter element and vertically below a top surface of the filter body, and the ring seal is coupled to an edge of the cylindrical bore and sealably engaged with the outside of the cylindrical projecting tube of the oil filter mount.

7. The oil filter of claim 1, wherein the porous material has a pore size of 12 microns and wherein the porous material is one or more of a cellulose media or a fibrous media.

8. The oil filter of claim 1, wherein the first cavity is formed by a wall of the housing, a first door of the oil filter, and the central oil passage, wherein the second cavity is formed by the wall of the housing, an opposite, second door of the oil filter, and the central oil passage, and wherein each oil filter element is adaptable to extend, within the first cavity or second cavity, from the base of the first filter mount to one of the first door or second door.

9. A system, comprising:
an interface between an oil filter element and an oil filter mount of an oil filter, the oil filter element having an open neck at a first end, the open neck wider than a linearly outwardly projecting step on a base of the oil filter mount, where the step surrounds a cylindrical projecting tube of the oil filter mount which extends from the base and into a cylindrical bore of a filter body of the oil filter element, past the step, where the filter body includes a porous material;
wherein the open neck of the oil filter element is fittable over an outer edge of the step and contacts the base of the oil filter mount at the first end, and wherein the open neck is coupled to and extends from a bottom surface of the filter body;
wherein the oil filter element extends outwardly from the base of the oil filter mount to a filter engagement surface of an oil filter housing of the oil filter, where the filter engagement surface is included on a door of the oil filter; and
wherein the base of the oil filter mount is formed by a central oil passage of the oil filter, wherein the step extends around a circumference of the cylindrical projecting tube, the cylindrical projecting tube extending outwardly from an interior cavity of the central oil passage and the base and toward the filter engagement surface of the oil filter housing.

10. The system of claim 9, wherein the filter engagement surface is sealable against a second end of the oil filter element, wherein the step comprises a spacer and contacts both the cylindrical projecting tube and base, and wherein the open neck of the oil filter element is positioned inward of an outer surface of the filter body.

11. The system of claim 9, wherein a first end of the step contacts the base of the oil filter mount at an outside edge of the step and a second end of the step contacts an outside of the cylindrical projecting tube at an inside edge of the step.

12. The system of claim 11, wherein the step and the cylindrical projecting tube are integrated together as one piece and wherein the oil filter includes a plurality of oil filter elements positioned therein.

13. The system of claim 11, wherein the step comprises a rubber material and has a triangular cross-section, the step tightly fit at the inside edge of the step to the cylindrical projecting tube and at the outside edge of the step to the base of the oil filter mount.

14. The oil filter of claim 1, wherein the oil filter is installed in a vehicle having an engine, and is configured to filter engine oil of the engine.

15. The system of claim 9, wherein the oil filter is installed in a vehicle having an engine, and is configured to filter engine oil of the engine.

16. An oil filter comprising:
an oil filter mount; and
an oil filter element having an open neck at a first end, the open neck wider than a linearly outwardly projecting step on a base of the oil filter mount, where the step surrounds a cylindrical projecting tube of the oil filter mount which extends from the base and into a cylindrical bore of a filter body of the oil filter element, past the step, where the filter body includes a porous material;
wherein the open neck of the oil filter element is fittable over an outer edge of the step and contacts the base of the oil filter mount at the first end, and wherein the open neck is coupled to and extends from a bottom surface of the filter body;
wherein the oil filter element extends outwardly from the base of the oil filter mount to a filter engagement surface of an oil filter housing of the oil filter, where the filter engagement surface is included on a door of the oil filter; and
wherein the base of the oil filter mount is formed by a central oil passage of the oil filter, wherein the step extends around a circumference of the cylindrical projecting tube, the cylindrical projecting tube extending outwardly from an interior cavity of the central oil passage and the base and toward the filter engagement surface of the oil filter housing.

17. The oil filter of claim 16, wherein a first end of the step contacts the base of the oil filter mount at an outside edge of the step and a second end of the step contacts an outside of the cylindrical projecting tube at an inside edge of the step.

18. The oil filter of claim 17, wherein the step and the cylindrical projecting tube are integrated together as one piece and wherein the oil filter includes a plurality of oil filter elements positioned therein.

19. The oil filter of claim 17, wherein the step comprises a rubber material and has a triangular cross-section, the step tightly fit at the inside edge of the step to the cylindrical projecting tube and at the outside edge of the step to the base of the oil filter mount.

20. The oil filter of claim 16, wherein the oil filter is installed in a vehicle having an engine, and is configured to filter engine oil of the engine.

\* \* \* \* \*